(12) United States Patent
Neira et al.

(10) Patent No.: US 10,911,744 B1
(45) Date of Patent: Feb. 2, 2021

(54) PORTABLE CAVE AUTOMATIC VIRTUAL ENVIRONMENT SYSTEM

(71) Applicant: University of Arkansas at Little Rock, Little Rock, AR (US)

(72) Inventors: Carolina Cruz Neira, Little Rock, AR (US); Dirk Reiners, Little Rock, AR (US)

(*) Notice: Subject to any disclaimer, the term of this patent is extended or adjusted under 35 U.S.C. 154(b) by 0 days.

(21) Appl. No.: 16/530,671

(22) Filed: Aug. 2, 2019

Related U.S. Application Data

(63) Continuation of application No. 15/887,395, filed on Feb. 2, 2018, now Pat. No. 10,412,380.

(51) Int. Cl.
| | |
|---|---|
| *H04N 7/18* | (2006.01) |
| *H04N 13/363* | (2018.01) |
| *G03B 21/58* | (2014.01) |
| *H04N 13/327* | (2018.01) |
| *H04N 9/31* | (2006.01) |
| *H04N 13/371* | (2018.01) |
| *H04N 13/38* | (2018.01) |
| *H04N 13/373* | (2018.01) |
| *H04N 13/376* | (2018.01) |
| *H04N 13/378* | (2018.01) |

(52) U.S. Cl.
CPC .......... *H04N 13/363* (2018.05); *G03B 21/58* (2013.01); *H04N 9/31* (2013.01); *H04N 13/327* (2018.05); *H04N 13/371* (2018.05); *H04N 13/373* (2018.05); *H04N 13/376* (2018.05); *H04N 13/378* (2018.05); *H04N 13/38* (2018.05); *H04N 2213/001* (2013.01)

(58) Field of Classification Search
CPC .. H04N 13/363; H04N 13/327; H04N 13/371; H04N 13/378; H04N 13/376; H04N 13/373; H04N 2213/001; H04N 13/38; G03B 21/58
See application file for complete search history.

(56) References Cited

U.S. PATENT DOCUMENTS

| | | | | |
|---|---|---|---|---|
| 6,152,854 A | * | 11/2000 | Carmein | A63B 22/025 482/4 |
| 6,490,011 B1 | * | 12/2002 | Cooper | G09F 9/00 312/7.2 |
| 2006/0114171 A1 | * | 6/2006 | Vascotto | G09B 9/00 345/1.1 |
| 2018/0084224 A1 | * | 3/2018 | McNelley | G09G 3/002 |

* cited by examiner

*Primary Examiner* — Richard T Torrente
(74) *Attorney, Agent, or Firm* — JRG Attorneys at Law

(57) ABSTRACT

A portable CAVE automatic virtual environment system. The system uses a light weight collapsible frame with an overhead beam that is raised and lowered via a lockable hinge on each of the vertical supports. Ultra-short throw projectors are attached to the overhead beam at its lowest position and are raised to their functional position where they are automatically configured to aim at one of the included screens. The projectors display imagery on the screens that form a space around the user. The system auto-calibrates to align the projected imagery to the screens to form a seamless display across all screens. The invention significantly decreases the time and labor to set up and calibrate a CAVE system and collapses into folded parts for easy transport and storage.

7 Claims, 8 Drawing Sheets

PORTABLE CAVE AUTOMATIC VIRTUAL ENVIRONMENT SYSTEM

CROSS-REFERENCE TO RELATED DOCUMENTS

This application is a Continuation Application of pending U.S. patent application Ser. No. 15/887,395 entitled "A Portable CAVE Automatic Virtual Environment System" filed Feb. 2, 2018.

STATEMENT OF FEDERALLY-SPONSORED RESEARCH

This disclosure was made with Government support under the ASSET III Cyberinfrastructure REU Grant No. 16-EPS3-0019 for the Center for Advanced Surface Engineering (CASE) awarded by the U.S. National Science Foundation. The Government has certain rights in the disclosure.

TECHNICAL FIELD

This invention relates to virtual reality (VR) technology, interactive 3-dimensional graphics, visualization, and more specifically, to methods and systems for creating a portable cave automatic virtual environment (CAVE), and applications of same.

BACKGROUND OF THE INVENTION

The CAVE (recursive acronym for "CAVE Automatic Virtual Environment") was created by one of the named inventors of the present invention (Cruz Neira) in 1992 at the University of Illinois at Chicago. The CAVE is an immersive virtual reality (VR) apparatus that uses projectors on three to six independent surfaces to create a "room" where imagery can be projected onto the walls, ceiling, and/or floor. The projectors may use front or back projection, and may be stereoscopic or monoscopic. Monoscopic projectors produce imagery that appears to be "painted" on the wall surfaces while stereoscopic projectors produce imagery that can appear in the same space where the observer (user) is standing or to extend beyond the walls.

For typical stereoscopic projectors, all viewers must wear some form of stereoscopic glasses. Active glasses are synchronized to the refresh rate of the projectors while passive glasses use polarized light to separate the eyes. Both are commonly used in CAVE implementations. Modernly, flat panel displays may also be used in lieu of projectors and can also be either stereoscopic or monoscopic but these have additional issues related to increased cost and minimizing the frames between displays.

If stereoscopy is used, typically one viewer within the projection space is tracked using a six degree-of-freedom (6DOF) tracking device and using the exact position and orientation of the tracked observer, all imagery on all projection surfaces is generated with the correct perspective for the eye point of the tracked observer. To achieve this, a number of coupled viewpoints are used equal to the number of projected surfaces. The camera position identifies the location and orientation of the viewpoint. For a 6-surface CAVE in a cubic configuration (for example), that camera must be split into 6 pairs of independent viewpoints (one viewpoint for each eye and one pair for each wall of the CAVE), each pair of viewpoints orthogonal to the others. Then each of the projectors must be synchronized if active stereoscopy is used.

Modern CAVE implementations are not designed and manufactured as integrated systems. They are a collection of independent components, customized for each buyer's physical space and budget, that are integrated by a vendor after manufacturing to work together. As such, they tend to be very large, heavy, cumbersome, and expensive. A modern CAVE can cost from $350,000 up to well over $1,000,000 depending on the number of screens required, the quality of projectors used, etc. They are typically driven by a computing cluster (more than one computer) therefore programming new applications is difficult because of the distributed nature of the computing architecture. Mirrors are often used to decrease the "throw distance" of a projector so that the projector may physically be in close proximity to the surface on which it is projecting. In short throw mode, most projectors need 3 to 8 feet from projector to screen. Using mirrors this can be decreased, however, each mirror surface decreases the brightness of the image as light is lost and increases the complexity of the system and the calibration process, therefore, it is advantageous to avoid the use of mirrors.

Typical projectors used in CAVEs are heavy and expensive, and they must be precisely configured and calibrated when setting up a CAVE apparatus. Conventional CAVE implementations include a basic frame (usually of some light but durable metal) to which the screens will attach. They also must have an external frame that can bear the weight of 3-6 large projectors and mirrors (if used).

The procedure to assemble and use a modern CAVE can take from two to three working days (usually more) and may require three to five trained people. A large portion of assembly time is spent in the calibration process. It also requires lifts and winches that are not part of the CAVE, but must be used to lift the heaviest components into place. Often, because of their size, the physical room that will house a CAVE must be customized to raise the ceiling (because CAVEs usually exceed standard ceiling heights) and also to add ventilation, air conditioning, and power to accommodate the computing cluster.

After assembling the internal frame for the projection screens and also the larger weight-bearing structure for the projectors, the screens are usually unrolled and snapped into place on the frame. The projectors can weigh from 400-500 lbs. each. A lift or winch is used to lift these up to the weight-bearing structure where they are secured with appropriate hardware. Many CAVEs are back-projected so mirrors are placed behind the screens so that an overhead projector pointed at the mirror will bounce once before projecting on the back of the installed screen. This is done for each projector in the configuration. The computing cluster is usually installed near the CAVE assembly, usually one computer per projector, or one graphics card per projector.

The calibration process can be demanding for a modern CAVE. The screens must be adjusted to minimize the gaps at the corners. Then a series of calibration patterns are projected onto each screen and adjustments are made for position, skew, color, stereo, and any other adjustable parameters on the projector. This is usually done manually and can take a full day to complete.

As stated above, if stereoscopy is used (which is extremely common, and usually required), a 6DOF tracker must be installed. This is a separate sub-system for most CAVE implementations. Developing applications that run on a CAVE requires integrating the tracker and the camera perspective calculations with the image generation. This is typically supported by a software development kit (SDK).

An SDK for developing CAVE applications is very limited due to the customized nature of all CAVES. In fact, the software framework for current CAVE systems would not be considered an SDK at all by today's developers. CAVEs usually include an old-style library of classes or they are operated with a graphics-interceptor software module that takes a single graphics stream and distributes it among all the computers in the system with small manipulations for perspective adjustment.

How the software operates will change based on how many projectors are used, the configuration of the screens, how many computers are in the cluster, the tracking system selected, and the use (or not) of stereoscopy. Most importantly, applications developed for one CAVE will not run in another CAVE or alternate VR system without significant adaptation to the source code. Lastly, many CAVEs allow for interactivity with displayed content. To accomplish this, a separate interaction device is employed. This can be a gamepad device, another 6DOF tracker (similar to the head-tracking device), a 6DOF wand-type device with buttons, or a hand-worn device with a 6DOF tracker. These devices are separately controlled via a serial input cable to one of the cluster computers.

SUMMARY OF THE INVENTION

While conventional CAVEs are not new, they suffer from a series of shortcomings that are addressed by the present invention.

1) CAVEs are a collection of disparate parts that are made to work together. They are not integrated systems by design and final integration is left to the user.

2) CAVEs are extremely heavy, consist of several cumbersome components, and are so difficult to assemble and calibrate that almost all installations are considered "permanent", thus not transportable.

3) CAVEs often will not fit in a standard room with a standard ceiling height and without special ventilation or air conditioning.

4) CAVEs are extremely expensive, not affordable for K-12 education and other less well funded organizations and smaller companies.

5) CAVE SDKs are extremely difficult to use to develop new software applications.

The present invention describes a CAVE system that is easy to set up for one or two untrained people in 30 minutes or less in a typical room with standard ceiling height without added ventilation or air conditioning. It is light weight and transportable so that it can be stowed and set-up on demand. The cost is at least one order of magnitude less than modern custom CAVE designs. And the SDK is compatible with other VR apparatus making development easier. The present invention integrates the CAVE components by initial design making it a consumer-level product that brings this technology to the hands of educators and other users to which it was previously unattainable.

The present invention is a self-standing structure (see FIGS. 1 and 2). The weight-bearing structure (see FIGS. 3-5) contains a built-in winch. From its lowered position, the light weight projectors are mounted, secured, and all cables attached. The winch then lifts the projectors to their final position and locks them into place. A wire harness protects all cables and simplifies installation. The projection screens unfold for use and do not require extra framing. A 360 degree camera is used for auto-calibration of the projectors.

The tracking system is integrated into the single computer that can control up to eight images on four simultaneous screens. Because the system operates on a single computer, the SDK is compatible with other VR apparatus such that applications developed for a head-mounted display (for example) can easily be adapted to run on the CAVE. Lastly, the present invention is expected to cost between $30,000 and $40,000.

DESCRIPTION OF THE INVENTION

Figure 1:
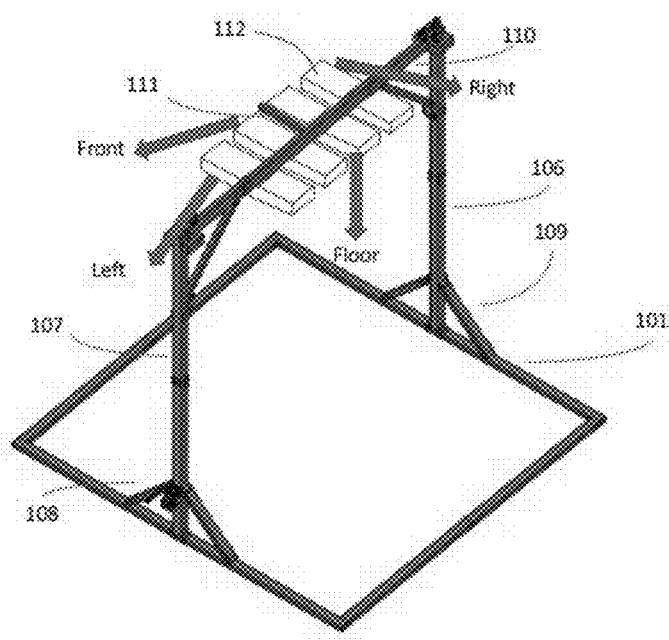
FIG. 1 is a schematic view of the support structure with four projectors mounted, one for the front, left, right, and floor projection surfaces.

To resolve the problems with state-of-the-art CAVEs enumerated previously, the present invention enables the use of lighter, less expensive components, where the design of the support structure inherently simplifies assembly and calibration.

The Support Structure

The core system consists of the support frame and overhead structure as shown in FIGS. 1-5. The frame is of a lightweight material with properties similar to aluminum in terms of weight and strength. The system described here is a 9'×9'×9' assembly, but the size can vary and does not need to be cubic in configuration. While the height could be greater than 10', a CAVE of this size may not fit in a standard size room.

The base of the frame (101) outlines the configuration of the side projection surfaces (screens) (202, 203, 204, 205). The base need not be a complete rectangle or square, its primary role being to provide adequate support for the horizontal beam (110) that bears most of the weight of the apparatus. The invention must have at least one projection surface (screen) but is not limited in the number of projection surfaces used. Alternative embodiments will be described below. The base frame and vertical supports as well as the horizontal beam are collapsible using hinges or similar to minimize the size of the apparatus when stored. The wiring harness can either be configured to run through the support structure or can be bundled to it with ties, but in either case, requires no adjustment by the user during assembly or disassembly.

The vertical support structure is the primary load-bearing structure of the apparatus. It contains two vertical members (106, 107) on either side that are supported with struts (108, 109) to eliminate any rotation or skew of the upright structure. The vertical supports are grooved on the inside surface to allow the horizontal beam to slide vertically between them from the floor to the top of the vertical supports.

The horizontal beam (110) carries the load of the projectors (112) through the vertical members and contains mounting points for each projector. The mounting points secure the projector and ensure that it remains in a fixed location with no possibility of horizontal, vertical or rotational movement. The mounting points are snappable brackets that ensure that each projector is in a specific final location where the position of the projected image is approximately known. The projectors are ultra-short throw projectors that are capable of projecting at a steep angle, thereby allowing the user to move close to the screen without casting a shadow. The auto-calibration procedure described below then removes any imperfections in the alignment between the projector and its screen. The horizontal beam also contains a cable guide for the cable harness.

Figure 2:
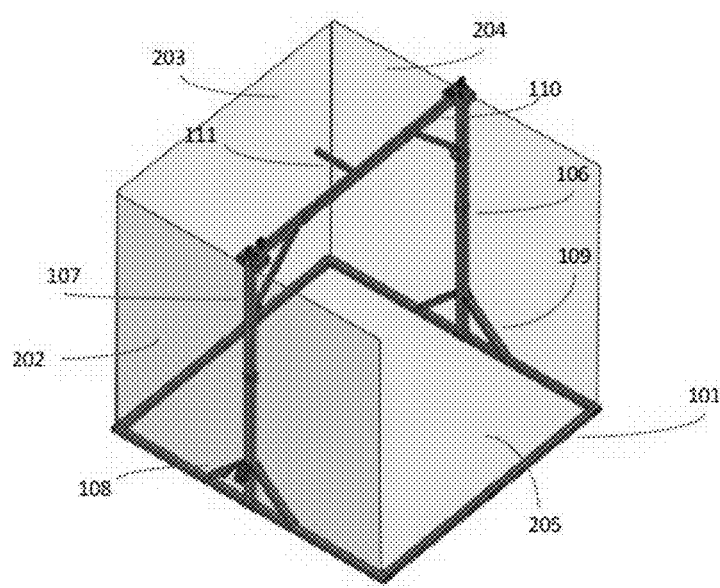
FIG. 2 shows the basic frame with four screens; left, front, right, and floor.
Figure 3:
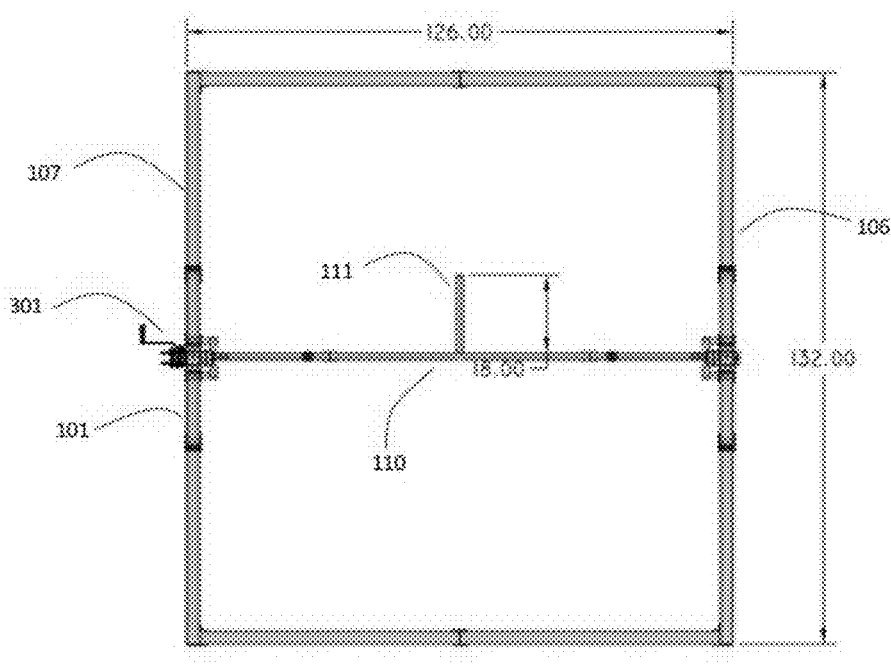
FIG. 3 is a top view of the support structure showing a 9'×9' footprint and the overhead support beam.
Figure 4:
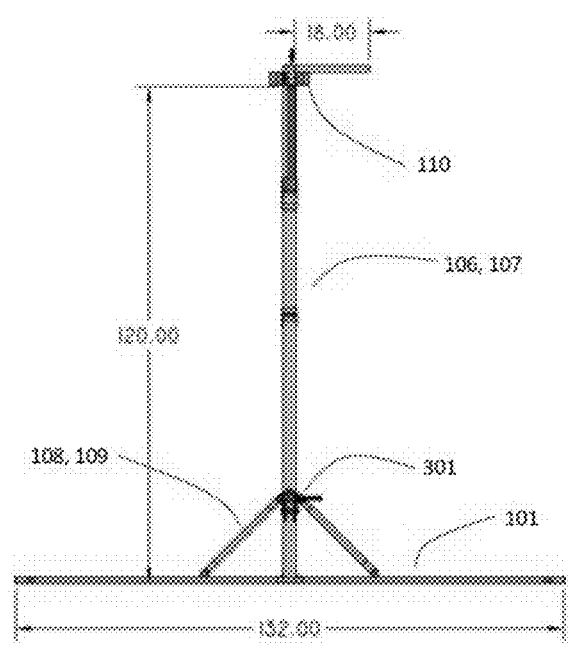
FIG. 4 is a side view showing the vertical support structure in its raised position.
Figure 5:
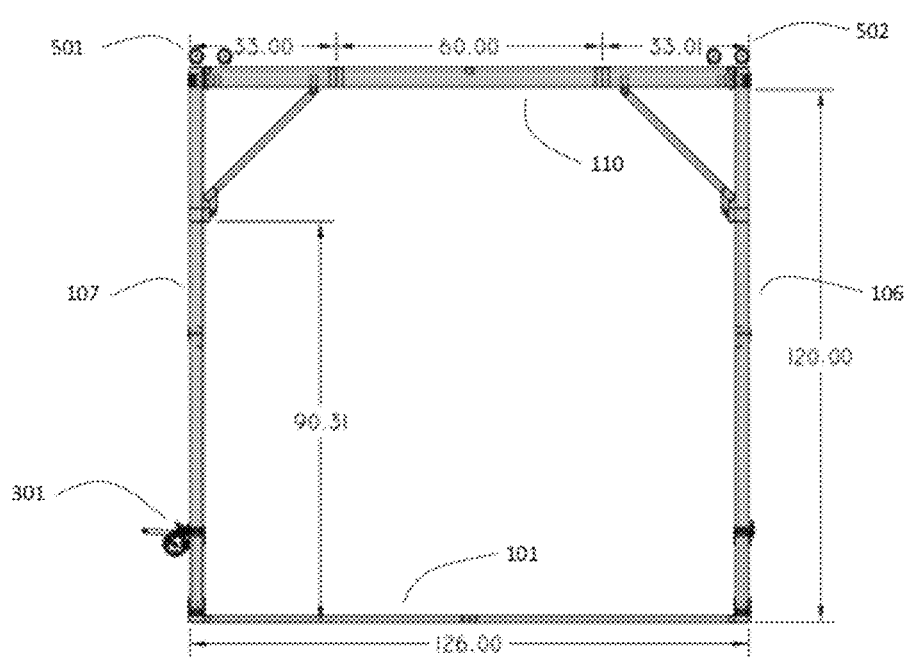
FIG. 5 is a front view showing the support structure in its raised position. Note the winch crank on the left side, pulleys on the horizontal beam on the top left and right.

The base frame may have vertical supports at the corners for connecting the projection screens. These may be unnecessary depending on the type of screen used. The projection screens are foldable (accordion type or similar) (see FIG. 6) and when unfolded connect to the base of the frame (101) and to each other (or to the corner vertical supports if present) with tension used to remove any wrinkles in the fabric. Screen material is a diffuse, wrinkle-resistant fabric commonly used in movie theaters. FIG. 2 shows a four-screen configuration with front (203), left (202), right (204), and floor (205) projection surfaces. As stated earlier, only one projection surface is required and the system can be easily expanded to include more projection surfaces as required by adding projectors and projection screens to the apparatus.

The horizontal beam (110) is raised and lowered between the vertical supports (106, 107) via a winch mechanism (301). The crank for the winch can be located on either vertical support but is fixed at a location where a person of average height can easily reach it. The winch is connected to a cable that extends over the horizontal beam on pulleys located at the corners (501, 502) of the vertical supports and the horizontal beam. Turning the winch crank raises and lowers the horizontal beam. The horizontal beam remains level with the floor at all times.

Figure 8:
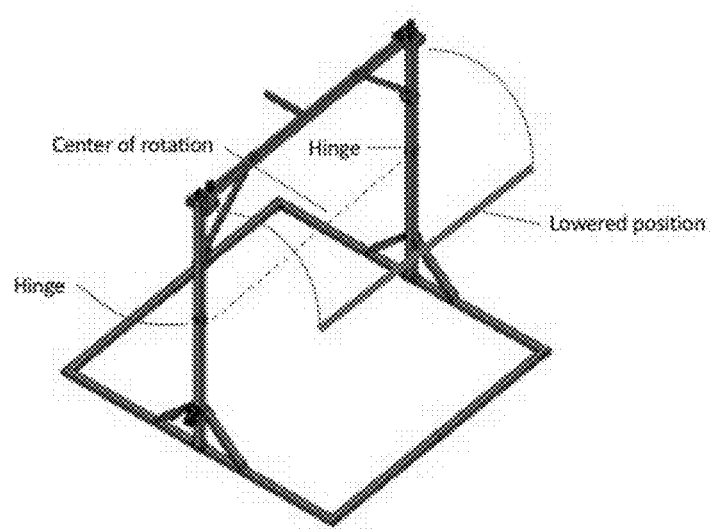
FIG. 8 is a schematic view of an embodiment that includes hinges on the vertical supports allowing the horizontal beam to be raised and lowered without a winch.

An alternative design for raising and lowering the horizontal beam without the use of a winch requires the use of hinges on the vertical supports (see FIG. 8). In this embodiment, the horizontal beam is fixed to the top of each vertical support. Approximately halfway down the vertical supports is a hinge and locking mechanism. To install the projectors, the user unlocks the hinges on the vertical supports and rotates the horizontal beam down. The projectors are now easy to install into the brackets. When complete, the entire horizontal beam which now has all projectors connected to it is rotated up to the vertical position and the hinges are locked. The winch embodiment is preferred because one person will be able to complete the entire installation whereas the hinge embodiment may require a second person to lift the horizontal beam into place.

The control computer is a commercial off the shelf computer having high resolution three-dimensional graphics capabilities (such as NVIDIA™ GTX or Quadro graphics cards) and wireless (e.g. Bluetooth) and/or wired (e.g. USB) data ports.

The wiring harness leads off of the main support structure to the control computer which may be located anywhere near the support structure. The projectors are each connected to a video output port on the control computer. A 360-degree camera is mounted on or near the middle of the horizontal support beam (111). The camera is connected to the control computer via a data port such as USB, Bluetooth, or similar. The 360-degree camera is used for the auto-calibration procedure described below.

To limit the amount of external light inside the working CAVE space, an opaque enclosure may be used. This can be a fabric in the form of a drape or similar, or it could be rigid, such as lightweight cardboard or similar. This feature is optional if the user is able to turn off the lights in the room and cover any windows during use. If the lights cannot be turned off, it may be required otherwise the imagery on the screen may wash out. Laser projectors may offer a partial solution to this problem but may also cost more.

A 6DOF tracking system is used for tracking the head of the user. This is required if stereoscopy is used. The 6DOF tracking system is connected via the wiring harness back to the control computer via a data port. Additionally, if an interaction device is desired, any device can be used but the invention contemplates a 6DOF tracking device such as a wand, hand-worn device, or a gamepad that is also connected to the control computer either via the wire harness to a data port or wirelessly via Bluetooth or similar. The system may also include a 3D audio system to present spatialized sound to the user that adapts to the application and the actions of the user.

The Software Development Kit (SDK)

The system includes a software development kit (SDK) that is similar in design and structure to other consumer VR-related SDKs. In fact, the goal of the design is to allow CAVE applications to be compatible to the greatest extent with other VR implementations such that a user can develop an application for an Oculus Rift or HTC Vive (for example) that is easily ported to the CAVE and vice versa. As stated above, modern CAVES do not have an SDK per se, but rather have a collection of libraries to which the developer writes the application. This makes the resulting software application specific to the CAVE for which it was developed. The SDK disclosed here hides the specifics of the CAVE apparatus from the developer, thus increasing the portability of the application source code. To change from one VR apparatus to another, all the developer must do is change to an alternate display device.

The Camera Calibration Process

As noted previously, the 360-degree camera is mounted on the horizontal beam near the center location (111). This is used to auto-calibrate the images produced by the projectors. The image from the projectors originates on the graphics card and is controlled via software on the control computer.

Figure 7:
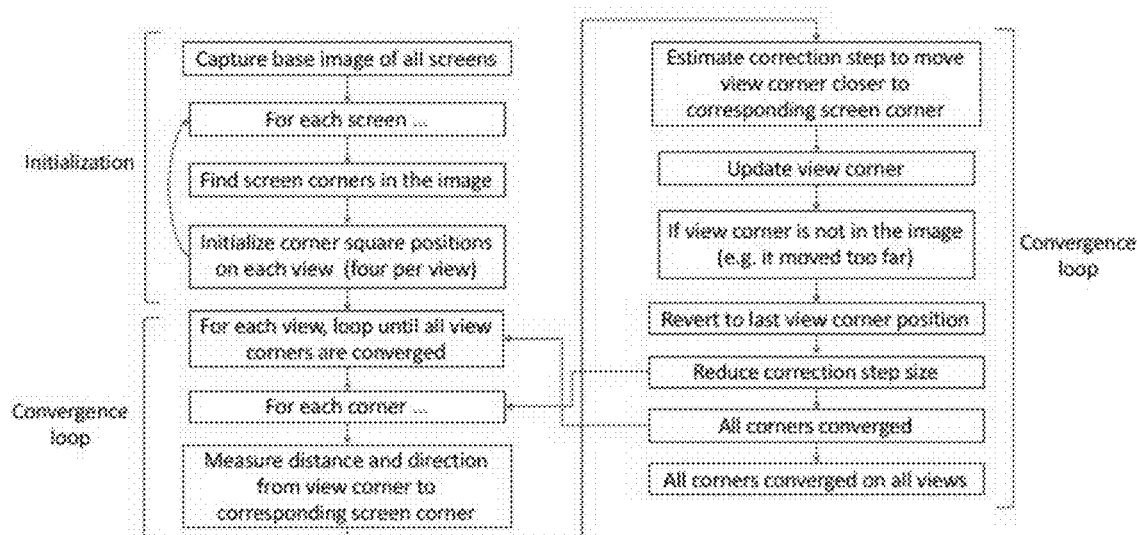
FIG. 7 shows the flow diagram of the auto-calibration procedure.

The auto-calibration process consists of two phases: initialization, and a convergence loop. The process is depicted in FIG. 7 and a pseudocode representation is provided below. Note that for this specification, "screen" refers to a physical screen, while "view" refers to a portion of the graphics raster that is sent to a specific projector.

The procedure begins with a capture via the 360-degree camera of a base image of all physical screens.

Then, for each screen, the base image is processed to identify the corners of each physical screen. There is one view (portion of the raster) assigned to each screen.

Within each view, initialize the corner square positions (initial "guess" of the location of the pixels in each view that correspond best to the corners of the physical screens). The initial corner square position is near the center of the view to ensure that all four initial corners are well within the boundary of the screen.

For each view, the following procedure is repeated until the view corners converge on the physical screen corners. For each corner within each view, measure the distance in pixels from the current location of the view corner to the corresponding screen corner. Estimate a correction step that moves the view corner towards the corresponding screen corner and update that view corner accordingly. If the view corner is no longer within the image (i.e. it moved too far), revert to the last known position, decrease the step size and repeat until the updated position results in unnoticeable improvements.

At this point all corners for each view have converged on the physical location of each corner in the base image. These coordinates are now used in the rendering algorithm to automatically adjust the rendered image for each screen to exactly match to the screen on which it is projected.

Pseudocode representation of the auto-calibration procedure:
Goal is to find the pixel coordinates in each view that best correspond to the physical screen corners

```
BEGIN
Capture base image from the 360-degree camera
For each screen {
   Locate the screen corners in the base image }
For each view {
   Initialize view corner square positions near center of the view area }
For each view {
   Repeat until view corners are converged on physical screen corners {
      For each corner {
         Measure distance and direction from current view corner to
            corresponding screen corner
         Estimate correction step to move view corner to corresponding
            screen corner
         Update view corner
         If view corner is not in the image (moved too far) {
            Revert to last known view corner position
            Reduce correction step
            Repeat } } }
END
```

Additional Embodiments

It is envisioned that a typical configuration of the present invention will include four screens as shown in FIG. 2; front, left, right, and floor. However, alternate configurations are possible. One embodiment of the present invention allows for a variable number of projection surfaces. In its simplest form, the invention has one screen. The screen can still be calibrated automatically, but there is no need to adjust for alignment to adjacent screens.

When two or more screens are used, the calibration process described above will account for the seam between the screens such that a pixel moving across one screen moves seamlessly to the next screen in a continuous motion.

In a cubic form, the invention can have up to five independent projection surfaces (no ceiling). However, the invention is not limited to projection screens positioned orthogonally to each other (at 90 degrees). Other configurations with non-orthogonal screen orientations are contemplated and can easily be configured and calibrated using the hardware and techniques disclosed here.

Figure 6:
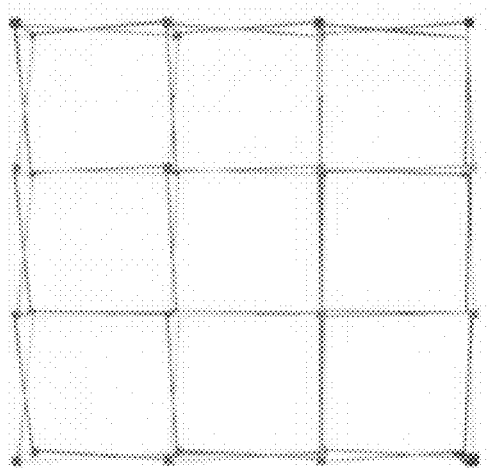
FIG. 6 shows the accordion frame used to support a projection screen.

The screens need not be of the accordion style described here (shown in FIG. 6). There are various other styles of screen including fixed surfaces and fabric surfaces that could be used. Fixed surfaces are less desirable because of their size. In the 9'×9'×9' configuration described earlier, each screen would be a 9'×9' rigid surface which is not transportable or lightweight, yet it would function within the present invention. Fabric screens are better because they can be rolled up for storage, but they result in an unwieldy 9' roll and require a collapsible rigid external frame to which they would attach.

The foregoing description of exemplary embodiments of the invention is presented for the purposes of illustration and is not intended to limit the invention to the precise forms disclosed. Many modifications and variations are possible in light of the above teaching.

INDUSTRIAL APPLICATION

The present invention applies to industries requiring 3D visualizations to include training, education (including K-12 and STEM), manufacturing, engineering, and data analysis (finance, science, or similar). Users of this invention require the ability to visualize and enter virtual spaces containing virtual objects that they perceive as 3D objects. They may interact with the objects in the space or may be passive viewers. Furthermore, because this invention is portable, low-cost, and easy to assemble, it is preferred by users with limited physical space.

What is claimed is:

1. A portable cave automatic virtual environment (CAVE) system comprising:
   a collapsible base frame forming a square structure with joined corners in contact with the floor having at least two vertical supports and a horizontal beam, said vertical supports being attached to the base frame at its center points and the vertical supports including struts connecting the bottom of the vertical support to the base frame, each vertical support having a lockable hinge approximately halfway up the vertical support for allowing the horizontal beam to swing up and lock into a full upright position perpendicular to the base frame;
   at least one screen connected in tension to collapsible vertical screen supports at the corners and attached to the base frame;
   at least one ultra-short throw projector fixed by mounts on the horizontal beam;
   a control computer connected to the projectors for generating high resolution three-dimensional imagery;
   a wiring harness enclosed within the horizontal beam and vertical supports containing power, video, and data cables to connect the projectors on the horizontal beam to the control computer;
   a six degree-of-freedom tracking device that attaches to the head of the primary viewer and is used for computing stereoscopic imagery; and
   a software development kit (SDK) that represents the entire CAVE system as a display device allowing the developer to change between the CAVE and other display alternatives with negligible changes to the software.

2. The system of claim 1 further including four short-throw projectors for three walls and the floor.

3. The system of claim 1 further including struts connected to the top of the vertical supports and to the horizontal beam.

4. The system of claim 1 further including brackets connected to the horizontal beam for quickly securing a projector to the horizontal beam.

5. The system of claim 1 where the screen is a fabric material that connects to the collapsible vertical screen supports.

6. The system of claim 1 further including a bracket around the vertical and horizontal supports for hanging a drape to block light from entering the projection area.

7. The system of claim 1 further including at least one hand-held input device that connects to the control computer via a data port.

\* \* \* \* \*